United States Patent
Svensson et al.

(10) Patent No.: US 7,474,611 B2
(45) Date of Patent: Jan. 6, 2009

(54) REDUCED COMPLEXITY CHANNEL ESTIMATION IN OFDM SYSTEMS

(75) Inventors: Jim Svensson, Ronneby (SE); Leif Wilhelmsson, Dalby (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 652 days.

(21) Appl. No.: 11/110,838

(22) Filed: Apr. 21, 2005

(65) Prior Publication Data

US 2006/0239178 A1    Oct. 26, 2006

(51) Int. Cl.
*H04J 11/00*    (2006.01)
(52) U.S. Cl. ................ 370/208; 370/203; 370/206; 370/210
(58) Field of Classification Search ........... 370/206, 370/208, 210
See application file for complete search history.

(56) References Cited

U.S. PATENT DOCUMENTS

| | | | |
|---|---|---|---|
| 5,828,710 A | 10/1998 | Beale | |
| 6,456,608 B1 | 9/2002 | Lomp | |
| 6,771,591 B1* | 8/2004 | Belotserkovsky et al. | ... 370/210 |
| 7,023,928 B2* | 4/2006 | Laroia et al. | ............ 375/260 |
| 7,058,002 B1* | 6/2006 | Kumagai et al. | ........... 370/203 |
| 7,227,834 B1* | 6/2007 | Barton et al. | .............. 370/208 |
| 2002/0021715 A1 | 2/2002 | Matheus et al. | |
| 2003/0026371 A1 | 2/2003 | Laroia et al. | |
| 2003/0058951 A1 | 3/2003 | Thomson et al. | |
| 2003/0227866 A1* | 12/2003 | Yamaguchi | ................ 370/208 |
| 2004/0105512 A1* | 6/2004 | Priotti | ....................... 375/340 |
| 2004/0228272 A1* | 11/2004 | Hasegawa et al. | ........ 370/210 |
| 2005/0157636 A1* | 7/2005 | Wen et al. | ................. 370/203 |
| 2006/0182063 A1* | 8/2006 | Ma et al. | ..................... 370/331 |
| 2006/0285599 A1* | 12/2006 | Seki et al. | ................... 375/260 |
| 2007/0053454 A1* | 3/2007 | Bhardwaj et al. | .......... 375/260 |

(Continued)

FOREIGN PATENT DOCUMENTS

DE    102 25 662 A1    1/2004

(Continued)

OTHER PUBLICATIONS

PCT International Search Report, dated Aug. 3, 2006, in connection with International Application No. PCT/EP2006/003174.

(Continued)

*Primary Examiner*—Huy D Vu
*Assistant Examiner*—Abdullah Riyami
(74) *Attorney, Agent, or Firm*—Potomac Patent Group PLLC

(57) ABSTRACT

A channel response estimate is generated from a received signal that comprises two or more different pilot carriers in an Orthogonal Frequency Division Multiplexing (OFDM) communications system. This involves, for each of the carriers, determining a rotation amount that is at least in part a function of a frequency separation between two adjacent carriers, a delay spread of the channel, and a position of the carrier relative to other carriers within the received signal. The received signal is processed with a Fast Fourier Transform, thereby generating a processed signal. Prior to performing frequency interpolation as part of a channel estimation process, the processed signal is rotated by the rotation amount. The channel response is estimated by performing the channel estimation process at least in part on the rotated processed signal.

51 Claims, 11 Drawing Sheets

U.S. PATENT DOCUMENTS

2007/0140323 A1* 6/2007 Patel et al. .................. 375/149
2007/0173208 A1* 7/2007 Nishio et al. .................. 455/78

FOREIGN PATENT DOCUMENTS

EP       1039713 A2    9/2000
EP       1172956 A1    1/2002

OTHER PUBLICATIONS

PCT Written Opinion, dated Aug. 3, 2006, in connection with International Application No. PCT/EP2006/003174.

Palin, A. and Rinne, J., "Enhanced symbol synchronization method for OFDM system in SFN channels," *Globecom'98*, Sydney, pp. 2788-2793.

ETSI EN 300 744 V.1.4.1 (Jan. 2001), Digital Video Broadcasting (DVB); Framing structure, channel coding and modulation for digital terrestrial television.

Classen, F., Speth, M. and Meyr, H., "Channel estimation units for an OFDM system suitable for mobile communication," in ITG Conference on Mobile Radio, Neu-Ulm, Germany, Sep. 1995.

Speth, M., Fechtel, S., Flock, G. and Meyr, H., "Optimum receiver design for OFDM-based broadband transmission—Part II: A case study," IEEE Trans. Commun., vol. 49, pp. 571-578, Apr. 2001.

Pentek "Applications" Article, "AT&T Labs-Research Designs a Broadband Radio Link for Internet Access" available at URL: www.pentek.com and known to be available on Jul. 7, 2004; Pentek, Inc., New Jersey, United States.

PCT International Preliminary Report on Patentability, mailed Jul. 10, 2007, in connection with International Application No. PCT/EP2006/003174.

* cited by examiner

REDUCED COMPLEXITY CHANNEL ESTIMATION IN OFDM SYSTEMS

BACKGROUND

The present invention relates to digital communication where Orthogonal Frequency Division Multiplexing (OFDM) is employed. More particularly, the invention relates to channel estimation in an OFDM communications system.

OFDM is a method that has been increasingly popular for transmitting digital information. Currently it is, for example, used for Digital Audio Broadcasting (DAB), Digital Video Broadcasting (DVB) such as DVB-Terrestrial (DVB-T), and for some Wireless Local Area Network (WLAN) standards like IEEE 802.11a and IEEE 802.11g. One of the reasons for using OFDM is that it allows for communication over highly time-dispersive channels using reasonable complexity at the receiver side.

In an OFDM system, a number of sub-carriers (henceforth referred to simply as "carriers") are independently modulated, each by its own data. The modulation can be in accordance with a number of well-known techniques, such as Quadrature Amplitude Modulation (QAM) or n-ary Phase Shift Keying (n-PSK). The baseband signal in an OFDM system is then the sum of these modulated sub-carriers. The baseband signal is then used to modulate a main radio frequency (RF) signal. An important aspect of demodulating such a signal (thereby retrieving the underlying baseband signal) involves processing it by a Fast Fourier Transform (FFT).

Whether a channel should be considered highly time-dispersive or not depends on the symbol rate that is used by the system. As a rule-of-thumb, a channel might be considered as non-dispersive if the root mean square (rms) delay spread of the channel is less than 10% of the symbol duration. Thus advantages of OFDM become more pronounced as the supported data rate is increased, which is exactly the case for most of the emerging systems.

The way to handle large delay spreads for a system based on OFDM is to make use of a guard interval (GI). The GI (also referred to in the literature as a "cyclic prefix", or "CP") is simply a copy of the last part of an OFDM symbol that is sent before the actual symbol. This is schematically illustrated in FIG. 1, which shows a number of symbols. An exemplary one of the symbols 101 includes a last portion 103 that is transmitted as a preceding guard interval 105 (time flows from left to right in the figure). Other guard intervals are similarly formed from end portions of their immediately succeeding symbols.

It is well-known that for a system based on OFDM the effect of the time-dispersive channel, known as inter-symbol interference (ISI), can be avoided provided that the length of the GI, $T_G$, is at least as long as the duration of the impulse response of the channel. The term $T_m$ is henceforth used herein to denote the maximum delay spread, as opposed to, for example, a root-mean-square (rms) delay spread value. Because of the ability of an OFDM system to handle large delay spreads, it is very suitable for so-called Single Frequency Networks (SFN), which might be used for broadcasting. (In a single frequency network, geographically spaced transmitters operate on a same frequency. To reduce interference, they are time synchronized with one another.)

Suppose that the information carrying part of the OFDM symbol begins at t=0, and that the length of the guard interval is $T_G$. If the channel has a maximum delay spread, $T_m$, the requirement on the start of the FFT window is given by $$-T_G + T_m \leq t \leq 0. \tag{1}$$

Thus, as long as $T_m \leq T_G$ it is possible to avoid ISI if t is chosen according to equation (1). However, if $T_m > T_G$ the issue is to choose t such that the effect of ISI is minimized. For systems designed for use in a SFN, the guard interval is typically so large that the first situation is the likelier one.

Now, as discussed above, ISI free reception is possible whenever $T_m \leq T_G$. However, this requires identifying the start of the information carrying part of the signal. For this reason, OFDM receivers include arrangements for estimating the timing and frequency of the received signal.

To further improve performance, OFDM receivers typically include channel estimators, whose job is to dynamically determine the channel response. This information is then used to enable the receiver to process the received signal in a way that compensates for the time dispersion effects of the channel.

A conventional way of determining the channel response in an OFDM receiver is to dedicate certain ones of the carriers for use in conveying pilot signals. The pilot signals contain known information that permits the channel estimator to determine the channel response on that carrier frequency at that particular instant in time by comparing the actually received signal with an expected signal (i.e., one that the receiver would have expected to receive under ideal channel conditions). The carriers conveying the pilot signals are spaced apart in frequency by an amount that permits the channel response of carriers lying in-between the pilot carriers to be accurately estimated by interpolating the channel responses determined for the pilot carriers.

FIG. 2 is a block diagram of an exemplary OFDM receiver. An analog signal, r(t), generated by receiving and downconverting to baseband a radiofrequency signal, is supplied to an analog-to-digital (A/D) converter 201. The downconversion from the radio frequency might alternatively be performed in several steps, so that the signal at the input of the A/D converter 201 is at an intermediate frequency (IF), and where the down-conversion from IF to baseband is done just after the A/D converter, prior to the further processing now to be described.

The digitized signal, r(k), is then supplied to a coarse timing and frequency estimation unit 203, which generates a coarse estimate of the timing and frequency offset of the received signal. (The frequency offset is the difference between the frequency of the transmitted signal and the frequency of the received signal.) This information is supplied to a frequency correction unit 205 as well as a GI removal unit 207. The GI removal unit 207 also receives the output of the frequency correction unit 205. Based on the best timing and frequency information available, the GI removal unit 207 removes the GI and supplies the information part of the received signal to an FFT unit 209, whose output is supplied to the remainder of the receiver, including a refined timing and frequency estimation unit 211, which is able to generate more accurate timing and frequency information from the FFT output signal. The more accurate frequency information is fed back to the frequency correction unit 205 to improve the receiver's performance. The more accurate timing information is similarly fed back to the GI removal unit 207 to improve the receiver's performance.

The output of the FFT unit 209 is also supplied to a channel estimator 213, which generates a complete estimate of the channel response, as explained above.

Although any value of t that fulfills Eq. (1) will ensure that inter-symbol interference (ISI) is avoided, the choice of t might still have an impact on a receiver's performance. Specifically, it can be shown that if the start of the FFT window is placed at ϵ samples too early (ϵ≧0), then the effect on the $k^{th}$ carrier at the output of the FFT, $\overline{X(k)}$ will be $$\overline{X(k)} = X(k)e^{-i2\pi k\epsilon/N}, \quad (2)$$

where X(k) is what the FFT output would be if ϵ=0, N is the number of samples corresponding to the duration of the information carrying part of one symbol, and k is an index representing the position of a carrier.

Thus, the different carriers will be rotated differently depending on their position, as represented by the index k. As a result, when interpolation is done in the frequency domain (i.e., when the channel response for carriers containing data is estimated using carriers containing pilots), performing the interpolation will become unnecessarily difficult. Consequently, although the same performance might be obtained even if the FFT window is placed ϵ samples too early, it usually comes at the expense of requiring a more complicated channel estimation procedure.

Since the effect of placing the FFT window ϵ samples too early is known, it can be easily compensated for simply by multiplying by $e^{i2\pi k\epsilon/N}$ prior to performing channel estimation. This is well-known, and described for instance in A. Palin and J. Rinne, "Enhanced symbol synchronization method for OFDM system in SFN channels," Globecom'98, Sydney, pp. 2788-2793. Thus, it is well-known that one might compensate for a non-optimal placement of the FFT window by properly rotating the signal before doing the channel estimation. However, given that ϵ is known, one might as well move the FFT window in the optimal position, and by that avoid the extra computations that would be required if the compensation were done after the FFT.

With an optimally chosen position for the FFT window, the required complexity for interpolating in frequency depends on the delay spread of the channel. Thus, if the delay spread of the channel is estimated, this knowledge can be used not only to design a (Wiener) filter, but it can also be used to determine how complicated the filter has to be. This is described in detail in U.S. patent application Ser. No. 10/920,928, entitled "Channel Estimation by Adaptive Interpolation" by Leif Wilhelmsson et al. A conclusion made in U.S. Ser. No. 10/920,928 is that to design an optimum filter, it is not sufficient to estimate only the delay spread (for instance the rms delay spread or the maximum delay spread); the correlation function (in the frequency direction) for the channel is also required.

Since the channel estimation is one of the most critical parts in an OFDM system for obtaining good performance, it is very important for the interpolation performance to be of sufficiently high quality. In addition, since the channel estimation accounts for a significant part of the computational complexity, it is also important to reduce the complexity of the interpolation filters that are used.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that generate a channel response estimate from a received signal that comprises two or more different pilot carriers in an Orthogonal Frequency Division Multiplexing (OFDM) communications system. This includes for each of the carriers, determining a rotation amount that is at least in part a function of a frequency separation between two adjacent carriers, a delay spread of the channel, and a position of the carrier relative to other carriers within the received signal. The received signal is processed, thereby generating a processed signal. This processing includes processing with a Fast Fourier Transform. Prior to performing frequency interpolation as part of a channel estimation process, the carrier components of the processed signal are rotated by corresponding ones of the rotation amounts. The channel response is estimated by performing the channel estimation process at least in part on the rotated processed signal.

In some embodiments, the rotation amount is determined in accordance with:

$$e^{i2\pi k(\Delta f T_{ds} c_{ds})},$$

where k is an index that identifies the position of a carrier included within the received signal, Δf is the frequency separation between two adjacent carriers, $T_{ds}$ represents the delay spread of the channel, and $c_{ds}$ is a constant. The delay spread of the channel may be, for example, a maximum delay spread $T_m$ ($c_{ds}$ equals ½ in this case) or a root-mean-square delay spread, $T_{rms}$ ($c_{ds}$ equals 1 in this case).

In alternative embodiments, the rotation amount is determined in accordance with:

$$e^{i2\pi k(\epsilon/N + \Delta f T_{ds} c_{ds})},$$

where ϵ represents an amount by which an FFT window is placed too early, N is a number samples corresponding to a duration of an information carrying part of one symbol modulated onto the received signal, k is an index that identifies a position of a carrier included within the received signal, Δf is the frequency separation between two adjacent carriers, $T_{ds}$ represents the delay spread of the channel, and $c_{ds}$ is a constant. The delay spread of the channel may be, for example, a maximum delay spread $T_m$ ($c_{ds}$ equals ½ in this case) or a root-mean-square delay spread, $T_{rms}$ (cd, equals 1 in this case).

In other embodiments, the rotation amount is determined based on a correlation function of the channel.

In another aspect of some embodiments, the received signal comprises a guard interval followed by a symbol; and the method comprises using a duration of the guard interval as an initial estimate of the delay spread of the channel (e.g., maximum delay spread or root-mean-square delay spread).

In yet other alternatives, rotating the processed signal by the rotation amount may be performed only if a comparison between the delay spread of the channel and a predefined value satisfies a predefined relationship.

In still other embodiments, determining the rotation amount and rotating the carrier components of processed signal by corresponding ones of the rotation amounts comprise for each of the carriers, generating an initial rotation amount that is at least in part a function of the frequency separation between two adjacent carriers, a delay spread of the channel, and a position of the carrier relative to other carriers within the received signal; rotating the carrier components of the processed signal by corresponding ones of the rotation amounts; and iteratively adjusting the initial rotation amounts based on a comparison of rotated signals on different carrier frequencies with one another and then again rotating the previously rotated processed signal by the adjusted rotation amount until an iteration termination condition is satisfied.

In yet other embodiments, rotation is accomplished by shifting samples of the received signal prior to their being processed with a Fast Fourier Transform.

BRIEF DESCRIPTION OF THE DRAWINGS

The objects and advantages of the invention will be understood by reading the following detailed description in conjunction with the drawings in which.

DETAILED DESCRIPTION

Figure 1:
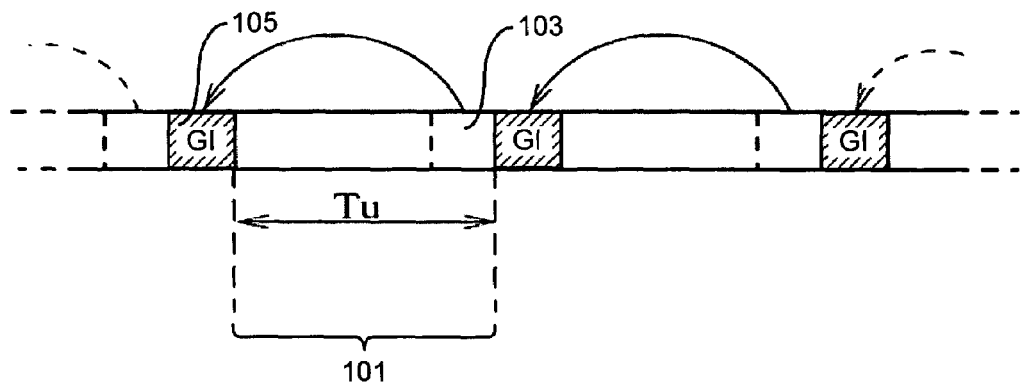
FIG. 1 is a schematic illustration of symbols separated by guard intervals in a an orthogonal frequency division multiplexing (OFDM) system.

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, optical disk or carrier wave (such as radio frequency, audio frequency or optical frequency carrier waves) containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

An improvement of the channel estimation is disclosed, which makes it possible for example to significantly reduce the complexity of an interpolation filter used for channel estimation in an OFDM receiver. An improvement can be obtained according to embodiments of the invention without having to estimate what the impulse response of the channel looks like. But, to obtain the largest gain, it is preferred that the correlation function of the channel be known. Since estimating the correlation function of the channel is a rather complicated operation, a number of alternative approaches are disclosed, each adding a minimum of additional complexity.

In one aspect, methods and apparatuses for performing channel estimation with reduced complexity are disclosed for use in OFDM systems. In some embodiments, this is achieved by estimating the start and the delay spread of the impulse response of the channel after the FFT. By taking the start as well as the delay spread into consideration, the signal can be rotated so that interpolation in the frequency direction can be done at lowest possible complexity. Alternative implementations are also disclosed in which the rotation is replaced by a re-ordering of the samples before the FFT. These and other aspects of the invention will now be described in greater detail.

To facilitate an understanding of the various aspects of the invention, the following description presents exemplary embodiments whose data are taken from the standard for terrestrial digital video broadcasting (DVB-T). See ETSI EN 300 744 V.1.4.1 (2001-01), Digital Video Broadcasting (DVB); Framing structure, channel coding and modulation for digital terrestrial television. However, the specific numbers presented in the exemplary embodiments are by no means restrictive. Rather, those skilled in the art will readily be able to apply the various aspects of the invention to other systems that are not in compliance with the standard for terrestrial DVB.

It will be assumed, then, that the duration of the information carrying part of an OFDM symbol $T_u$, is equal to 896 μs, and that the length of the GI is $T_u/4=224$ μs.

Suppose that the channel is modeled as a two-tap channel where the random channel taps have equal (average) strength, and where the distance (in time) between the two taps equals $T_m$. Although in many cases, this would be an over-simplified channel model, it can be quite realistic when single frequency networks (SFNs) are involved, because in such networks the received signal might come from two different transmitters, with very different distances to the receiver. In addition, the channel model simplifies the description of the disclosed idea. The correlation function for this channel (in the frequency domain) can then be written $$r(\Delta f)=\cos(\pi \Delta f T_m) \cdot e^{-i\pi \Delta f T_m}, \quad (3)$$

where $\Delta f$ is the frequency separation between the two carriers for which the correlation function is being estimated.

Now, if one is using pilots that are separated by $\Delta f$ Hz to determine, by means of a low-pass filter, what the channel looks like at frequencies in-between, it can be shown that $$T_m \leq \frac{1}{\Delta f}$$

is a necessary condition for avoiding aliasing. See F. Classen, M. Speth, and H. Meyr, "Channel estimation units for an OFDM system suitable for mobile communication," in ITG Conference on Mobile Radio, Neu-Ulm, Germany, September 1995.

It is now observed that the effect of the delay spread of the channel has a similar effect on the signal at the output of the FFT as too early placement of the FFT window has on the FFT output signal, namely that the different carriers will be rotated differently depending on their position, (represented by the index k). Thus, in a similar way as can be done to compensate for too early placement of an FFT window, in an aspect of the invention the complexity of the interpolation filter needed in the frequency domain can be reduced by rotating the signal prior to channel estimation based on frequency separation between two adjacent carriers, a delay spread of the channel, and a position of the carrier relative to other carriers within the received signal. Of course, in practical embodiments, it is possible (although not essential for practicing the invention) to rotate the signal by an amount that will achieve both objectives: reduction of interpolation filter complexity and compensation for too early placement of the FFT window.

Specifically, suppose that the correlation function for the channel is given by Eq. (3), that $T_m$ is known, and that the FFT window is placed an amount, ϵ, too early. Then, rather than rotating each carrier, k, of the signal by $$e^{i2\pi k\epsilon/N}, \quad (4)$$

which would only compensate for an erroneously placed FFT window, each carrier, k, of the signal is rotated by $$e^{i2\pi k(\epsilon/N+\Delta f T_m/2)}, \quad (5)$$

which compensates not only for too early placement of the FFT window, but also enables a reduction in interpolation filter complexity. Stated more generally, the reduction in interpolation filter complexity is enabled by rotating the signal prior to channel estimation by an amount that is at least in part a function of a frequency separation between two adjacent carriers, a delay spread of the channel, and a position of the carrier relative to other carriers within the received signal. For example, if one were unconcerned with compensating for placement of the FFT window but wanted to, nonetheless, enable a reduction in interpolation filter complexity, the rotation amount would be $e^{i2\pi k(\Delta f T_m/2)}$, which is at least in part a function of $\Delta f$ (the frequency separation between two adjacent carriers), $T_m$ (the delay spread of the channel), and k (an index representing a position of a carrier relative to other carriers within the received signal).

As explained earlier, the above discussion is relevant for the case of a two-tap channel model in which the random channel taps have equal (average) strength, and in which the distance (in time) between the two taps equals $T_m$. If we now consider the more general case, we find that to compensate for too early placement of the FFT window and in addition to enable a reduction in interpolation filter complexity, the amount of rotation that each carrier, k, of the signal should be subjected to prior to channel estimation is:

$$e^{i2\pi k(\epsilon/N+\Delta f T_{ds} c_{ds})}, \quad (5')$$

where k is an index that identifies a position of a carrier included within the received signal, $\Delta f$ is the frequency separation between adjacent carriers, $T_{ds}$ represents the delay spread of the channel (e.g., the maximum delay spread or the rms delay spread), and $c_{ds}$ is a constant that depends on what type of delay spread is being used in the function. For example, where the maximum delay spread, $T_m$, is used then $c_{ds}$ equals ½. This is represented above by Eq. (5). To take another example, if rms delay spread, $T_{rms}$, is used then $c_{ds}$ equals 1, and the amount of required rotation is:

$$e^{i2\pi k(\epsilon/N+\Delta f T_{rms})}. \quad (5'')$$

In all cases, the amount of rotation that the signal should be subjected to prior to channel estimation is given by an expression that is at least in part a function of the frequency separation between the carriers ($\Delta f$), the delay spread (e.g., any of $T_{ds}$, $T_m$, and $T_{rms}$) and the position of the carrier (k).

Whereas a sampling error will result in a deterministic carrier dependent rotation for which perfect compensation is attainable, the delay spread of the channel will result in a stochastic rotation, but where the expected value of the rotation can be compensated.

Figure 3A:
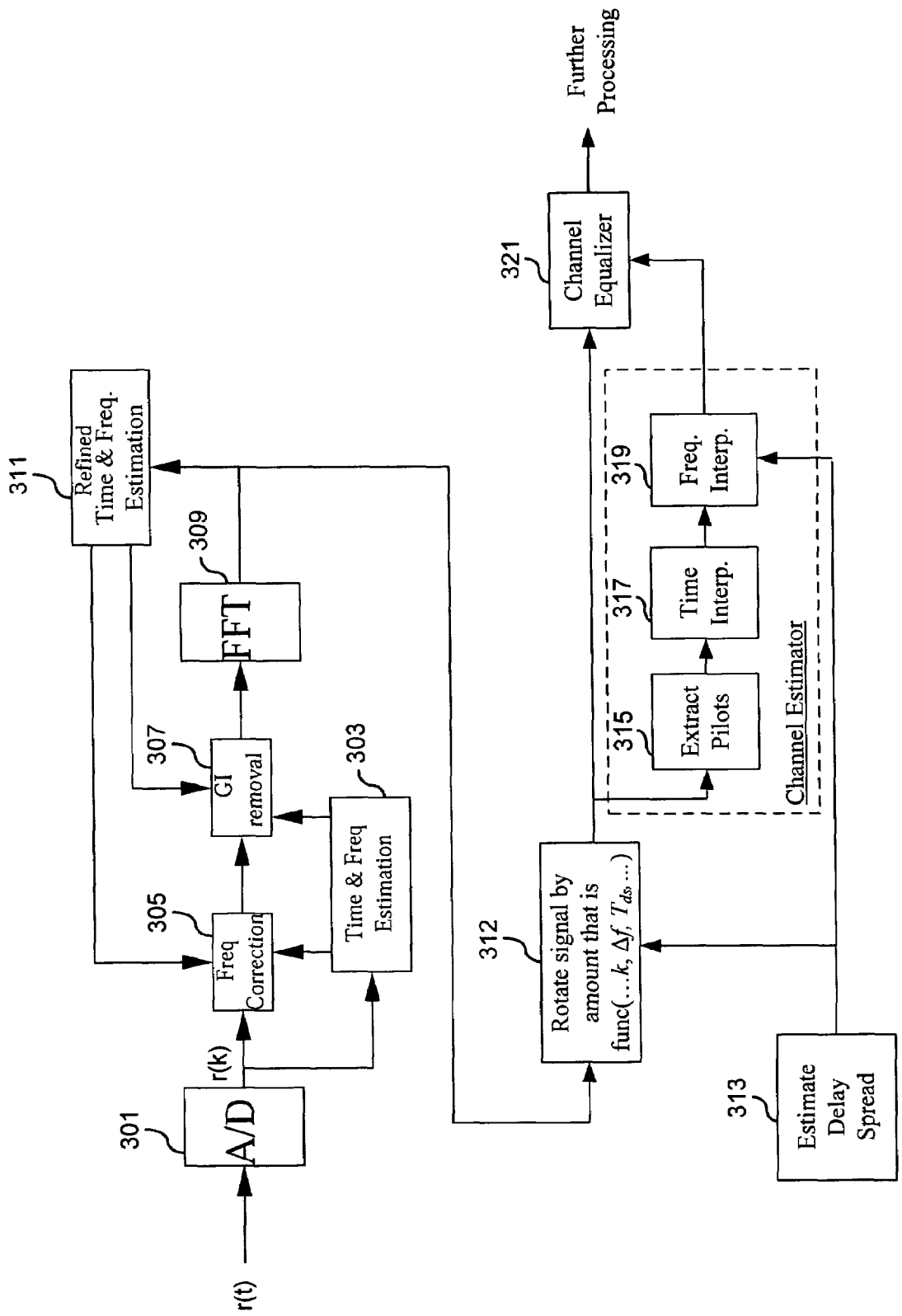
FIG. 3a is a block diagram of an exemplary embodiment of an OFDM receiver in accordance with the invention.

FIG. 3a is a block diagram of an exemplary embodiment of an OFDM receiver in accordance with the invention. An analog signal, r(t), generated by receiving and downconverting to baseband a radiofrequency signal, is supplied to an analog-to-digital (A/D) converter 301. The downconversion from the radio frequency might alternatively be performed in several steps, so that the signal at the input of the A/D converter 301 is at an intermediate frequency (IF), and where the down-conversion from IF to baseband is done just after the A/D converter 301, prior to the further processing now to be described.

The digitized signal, r(k), is then supplied to coarse timing and frequency estimation logic 303, which generates a coarse estimate of the timing and frequency offset of the received signal. (The frequency offset is the difference between the frequency of the transmitted signal and the frequency of the received signal.) This information is supplied to frequency correction logic 305 as well as GI removal logic 307. The GI removal logic 307 also receives the output of the frequency correction logic 305. Based on the best timing and frequency information available, the GI removal logic 307 removes the GI and supplies the information part of the received signal to FFT logic 309, whose output is supplied to the remainder of the receiver, including refined timing and frequency estimation logic 311, which is able to generate more accurate timing and frequency information from the FFT output signal. The more accurate frequency information is fed back to the frequency correction logic 305 to improve the receiver's performance. The more accurate timing information is similarly fed back to the GI removal logic 307 to improve the receiver's performance.

The output of the FFT logic 309 is also supplied to signal rotation logic 312, which rotates the signal by an amount that is at least in part a function of the frequency separation between the carriers ($\Delta f$), the delay spread (e.g., any of $T_{ds}$, $T_m$, and $T_{rms}$) and the carrier index (k). For example, the signal rotation logic 312 may, in some embodiments, be designed to carry out a signal rotation in accordance with Eq. (5). Because Eq. (5) calls for an estimate of the delay spread of the channel, a delay spread estimator 313 is also included for generating and supplying this information.

The rotated signal (also referred to herein as a "pre-rotated" signal, since the rotation is performed prior to performing frequency interpolation as part of a channel estimation process) is then supplied to pilot extraction logic 315, whose output comprises the pre-rotated pilot signals that were contained in the received signal r(t). The pre-rotated pilot signals are then supplied to time interpolation logic 317, which generates interpolated pilot signals for those carriers associated with the received pilot signals. The set of pilot signals (both actual and time interpolated) are then supplied to frequency interpolation logic 319, which applies interpolation in the frequency direction to generate a complete set of interpolated pilot signals for those carriers that did not carry any pilot signals. To perform its function, the frequency interpolation logic 319 also relies on the output from the delay spread estimator 313.

Figure 2:
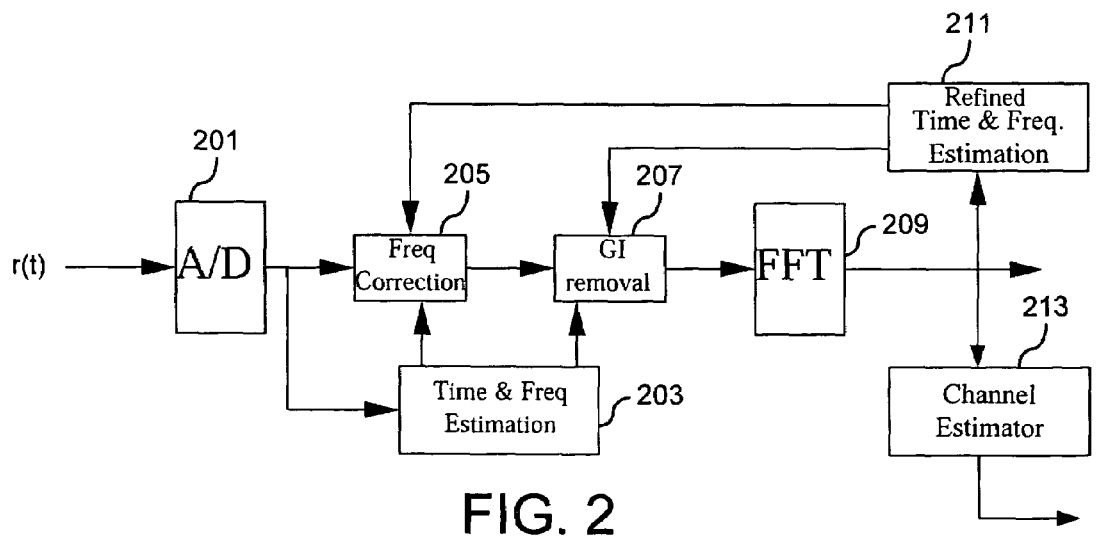
FIG. 2 is a block diagram of an exemplary OFDM receiver.

Also in this embodiment is a channel equalizer 321, which receives the pre-rotated signal from the signal rotation logic 312, and also receives the complete set of channel estimates from the frequency interpolation logic 319. The channel equalizer 321 generates estimates for the symbols sent on all carriers. By plotting these estimates for all carriers, a so-called I-Q diagram is obtained. Because of the pre-rotation imparted by the signal rotation logic 312, the frequency interpolation logic 319 may be designed to be less complex than the frequency interpolation logic (not shown) included within the conventional channel estimator 213 depicted in FIG. 2.

Inherent in the channel estimation strategy illustrated in FIG. 3a is that after the applied rotation amount is changed, the time interpolation logic 317 will take some time until it generates a proper output. This is easily seen by observing that the interpolation in time is calculated based on several OFDM symbols. If these symbols are not all pre-rotated by the same amount, the interpolation will not work properly. Therefore, once the pre-rotation amount is changed, it takes some time for the receiver to "settle" and once again work properly, where the settling time depends on the amount of OFDM symbols used in the time-interpolation. If an iterative technique is used to determine the proper amount of pre-rotation to apply (described in greater detail below with reference to FIG. 13), then the amount of time required for each iteration depends on the size of the interpolation-in-time filter. The problem with this "memory" effect is not so much that it takes somewhat longer for the receiver to find a suitable pre-rotation amount, but more that the tracking ability of the receiver will be limited. That is, suppose that the effective channel as seen after the FFT is slowly drifting. Then this drift can be compensated by adjusting the pre-rotation accordingly. However, since compensation in this case means continuously updating the amount of pre-rotation applied, this must be done slowly enough to avoid causing any degradation.

Figure 3B:
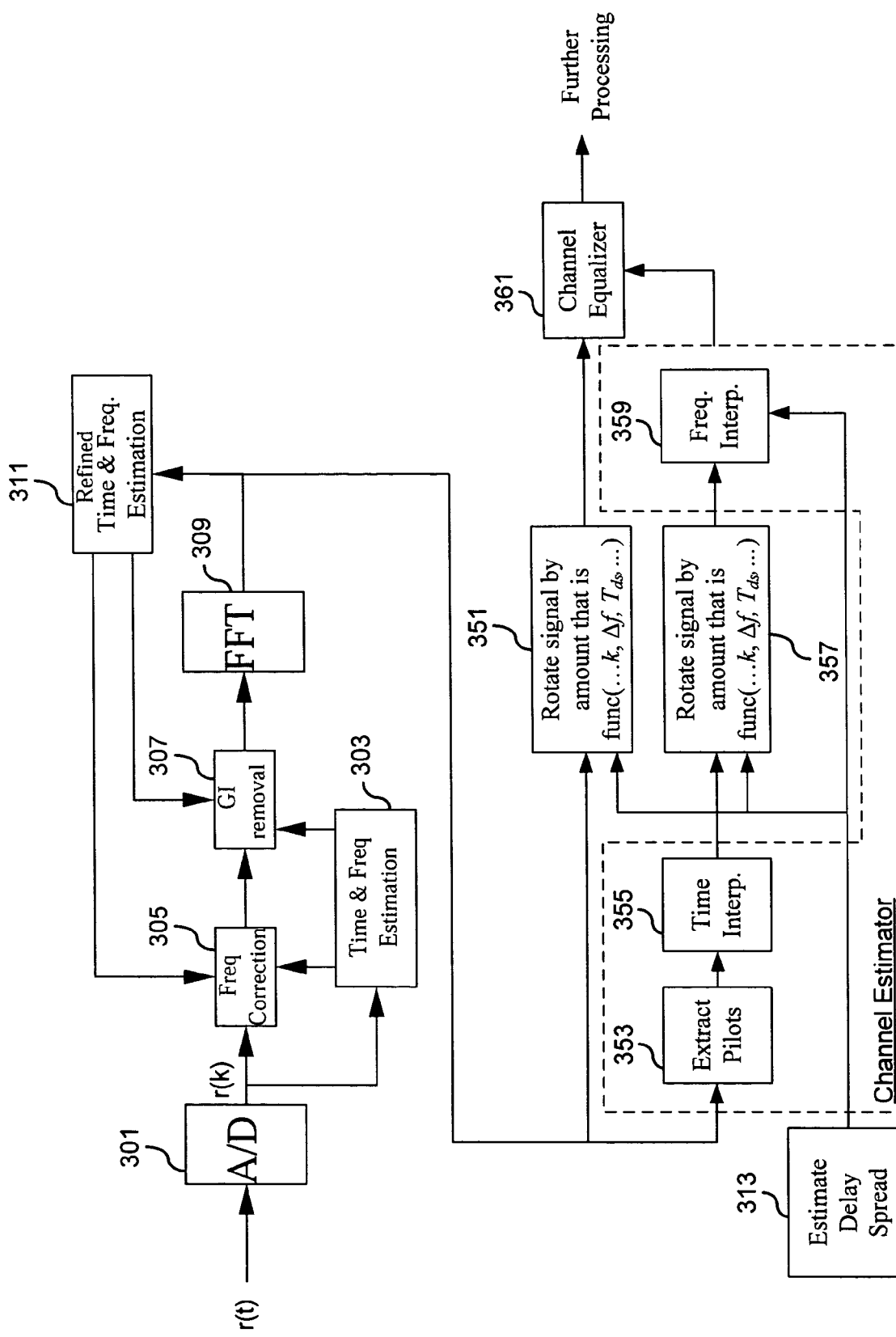
FIG. 3b is a block diagram of an exemplary alternative embodiment of an OFDM receiver in accordance with the invention.

To avoid this problem, an alternative approach may be adopted. FIG. 3b is a block diagram of an exemplary alternative embodiment of an OFDM receiver that utilizes the alternative approach. The blocks designated by reference numerals 301, 303, 305, 307, 309, and 311 operate as described above with respect to FIG. 3a. Consequently, this description need not be repeated here.

In the arrangement of FIG. 3b, the output of the FFT logic 309 is also supplied to first signal rotation logic 351, which rotates the signal by an amount that is at least in part a function of the frequency separation between the carriers ($\Delta f$), the delay spread (e.g., any of $T_{ds}$, $T_m$, and $T_{rms}$) and the carrier index (k). For example, the signal rotation logic 351 may, in some embodiments, be designed to carry out a signal rotation in accordance with Eq. (5). Because Eq. (5) calls for an estimate of the delay spread of the channel, a delay spread estimator 313 is also included for generating and supplying this information.

The output of the FFT logic 309 is additionally supplied to pilot extraction logic 353, whose output comprises the pilot signals transmitted on select carriers of the received signal, r(t). The pilot signals are then supplied to time interpolation logic 355, which generates interpolated pilot signals for those carriers associated with the received pilot signals. The set of pilot signals (both actual and time interpolated) are then supplied to second signal rotation logic 357, which rotates the pilot signals by the same amount as is done by the first pre-rotation logic 351.

The pre-rotated pilot signals are then supplied to frequency interpolation logic 359, which applies interpolation in the frequency direction to generate a complete set of interpolated pilot signals for those carriers that did not carry any pilot signals. To perform its function, the frequency interpolation logic 359 also relies on the output from the delay spread estimator 313.

The pre-rotated pilot signals from the frequency interpolation logic 359 as well as the pre-rotated signals from the first pre-rotation logic 351 are then supplied to a channel equalizer 361, which uses these to generate a complete estimate of the sent symbols.

The theory of operation of the exemplary embodiment of FIG. 3b will now be described. Here, the pre-rotation is not performed until after the interpolation in time has been performed. Since the rotation has no effect on this operation, the performance in the time direction is completely unaffected by any changes in pre-rotation amounts. Since the interpolation in the frequency direction is only over one OFDM symbol, there is no memory effect, and one might alter the amount of pre-rotation and immediately apply (a possibly different)

interpolation filter in the frequency direction. Note, however, that since the signal used to estimate the channel is rotated, the actual symbol must also be rotated by the same amount; hence, the use of first and second pre-rotation logic 351, 357 in the paths shown.

When one assumes that the DVB parameters are in effect (i.e., N=8192, and Δf=1116 Hz), it is easy to calculate that the rotation caused by a two-tap channel with $T_m$=100 µs has the same effect as a sampling error of ϵ=457 samples.

To provide insight into what gains can be obtained, some examples based on the Digital Video Broadcasting-Terrestrial (DVB-T) standard are now provided in the form of In-phase/Quadrature-phase (IQ)-diagrams.

Figure 4:
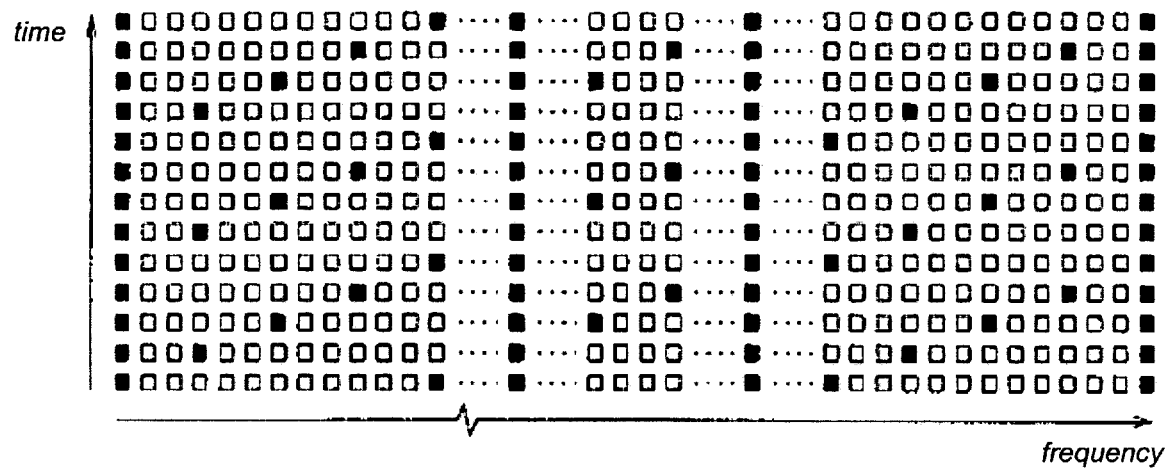
FIG. 4 is a timing diagram showing a signal frame structure in accordance with the DVB-T standard.

FIG. 4 is a timing diagram showing the frame structure in accordance with the DVB-T standard. The frequency domain extends along the horizontal axis, and the time domain extends along the vertical axis. Each square represents transmitted data; the vertical position of the square indicates its time of transmission, and the horizontal position of the square indicates which carrier frequency it is transmitted on. Black squares indicate pilot data. It can be seen from the diagram how the pilot data is scattered in a known pattern across both time and frequency.

In DVB-T, it is commonplace to perform channel estimation by first performing interpolation in the time direction, and then performing interpolation in the frequency direction. The reason for first performing interpolation in time is that this allows for estimating channels with larger delay spreads, since after interpolation in time has been performed, every third carrier contains a pilot as opposed to the case where interpolation in frequency would have been performed first, in which case every twelfth carrier would be a pilot.

Figure 5:
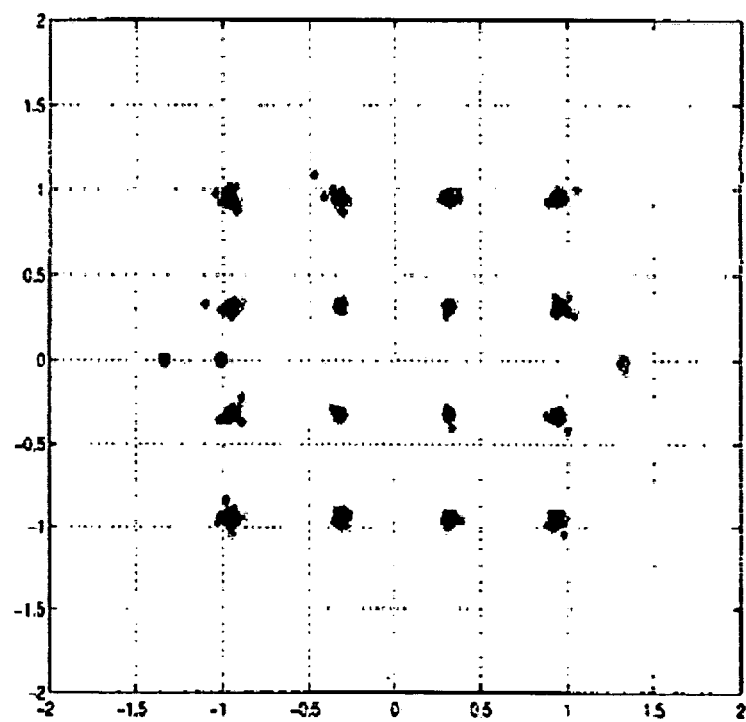
FIG. 5 is an IQ-diagram for the case in which the sampling point is ideal (i.e., $\epsilon=0$), interpolation in frequency is based on linear interpolation, the channel is static with a uniform delay profile and a maximum delay spread of $T_m=20$ μs, and no pre-rotation was performed.
Figure 6:
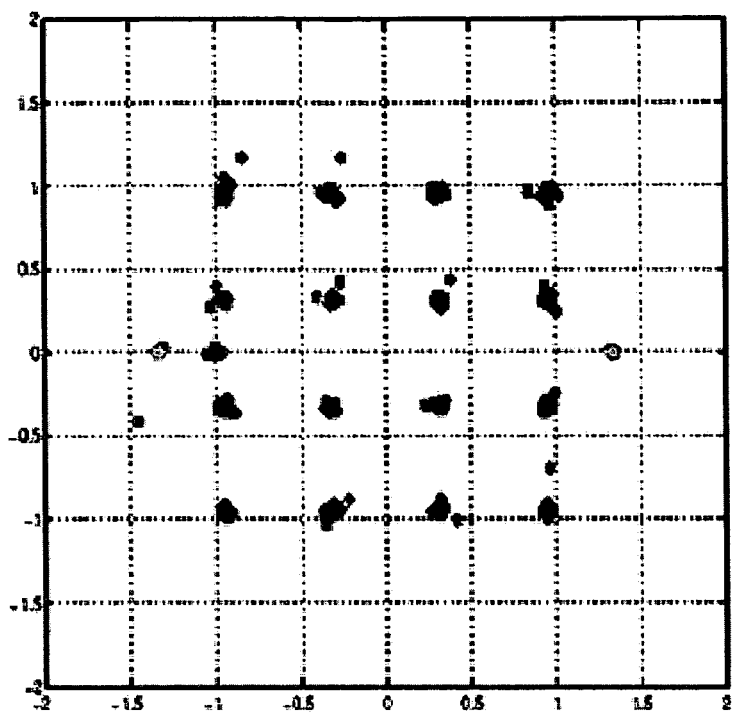
FIG. 6 is an IQ-diagram for the case in which the sampling point is ideal (i.e., $\epsilon=0$), interpolation in frequency is based on linear interpolation, the channel is static with a uniform delay profile and a maximum delay spread of $T_m=20$ μs, and ideal pre-rotation was performed (i.e., pre-rotation based on the known correlation function of the channel).

FIGS. 5 and 6 are IQ-diagrams for the case in which the sampling point is ideal (i.e., ϵ=0), interpolation in frequency is based on linear interpolation, and the channel is static with a uniform delay profile and a maximum delay spread of $T_m$=20 µs. The data shown in FIG. 5 are for the case in which no pre-rotation was performed, whereas in FIG. 6, ideal pre-rotation was performed (i.e., pre-rotation based on the known correlation function of the channel). As can be seen, the difference is hardly visible. This is due to the delay spread being very small compared to what can be handled in theory.

Figure 7:
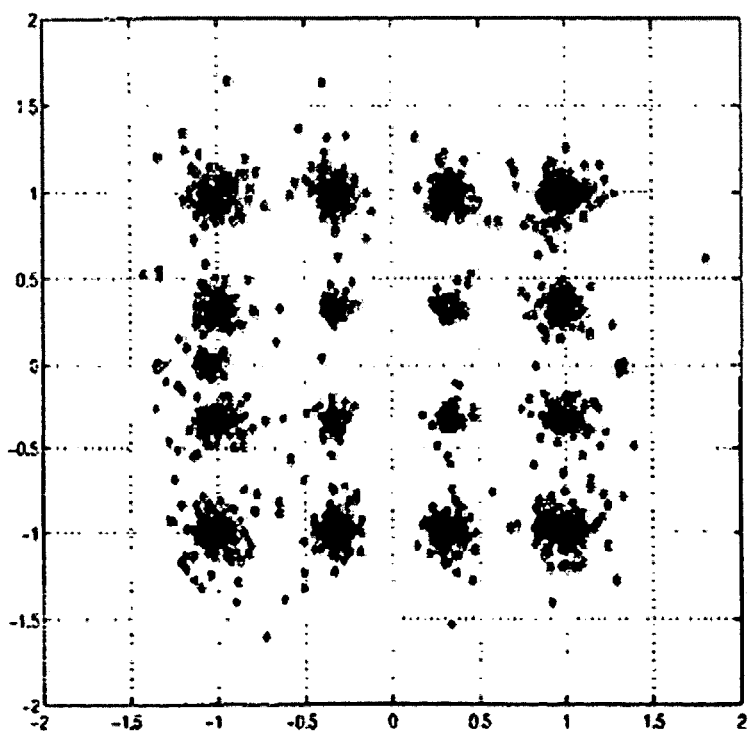
FIG. 7 is an IQ-diagram for the case in which the sampling point is ideal (i.e., $\epsilon=0$), interpolation in frequency is based on linear interpolation, the channel is static with a uniform delay profile and a maximum delay spread of $T_m=50$ μs, and no pre-rotation was performed.
Figure 8:
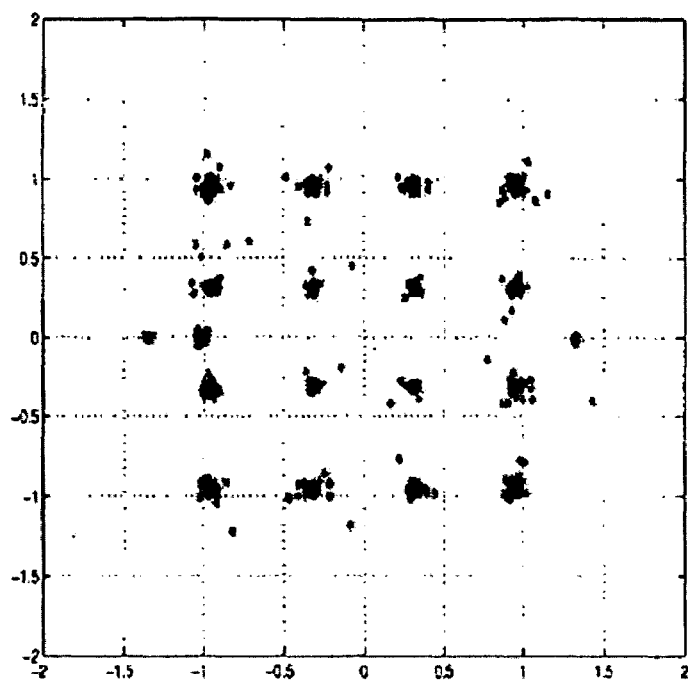
FIG. 8 is an IQ-diagram for the case in which the sampling point is ideal (i.e., $\epsilon=0$), interpolation in frequency is based on linear interpolation, the channel is static with a uniform delay profile and a maximum delay spread of $T_m=50$ μs, and ideal pre-rotation was performed (i.e., pre-rotation based on the known correlation function of the channel).

FIGS. 7 and 8 are IQ-diagrams that enable the same comparison to be made, but this time with $T_m$=50 µs. In this case, the gain is clearly seen, as the pre-rotation has moved the IQ positions of each of the data points from the various carriers much closer to their ideal positions (compare how much FIG. 8, which shows the IQ-diagram resulting from the use of pre-rotation in accordance with the invention, resembles FIG. 5, which shows the IQ-diagram for the case in which the sampling point is ideal (i.e., ϵ=0)).

Figure 9:
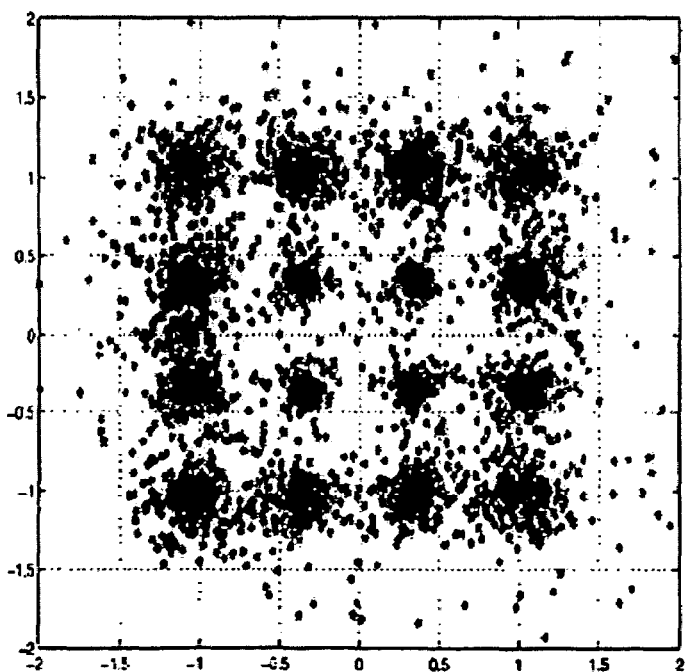
FIG. 9 is an IQ-diagram for the case in which the sampling point is ideal (i.e., $\epsilon=0$), interpolation in frequency is based on linear interpolation, the channel is static with a uniform delay profile and a maximum delay spread of $T_m=100$ μs, and no pre-rotation was performed.
Figure 10:
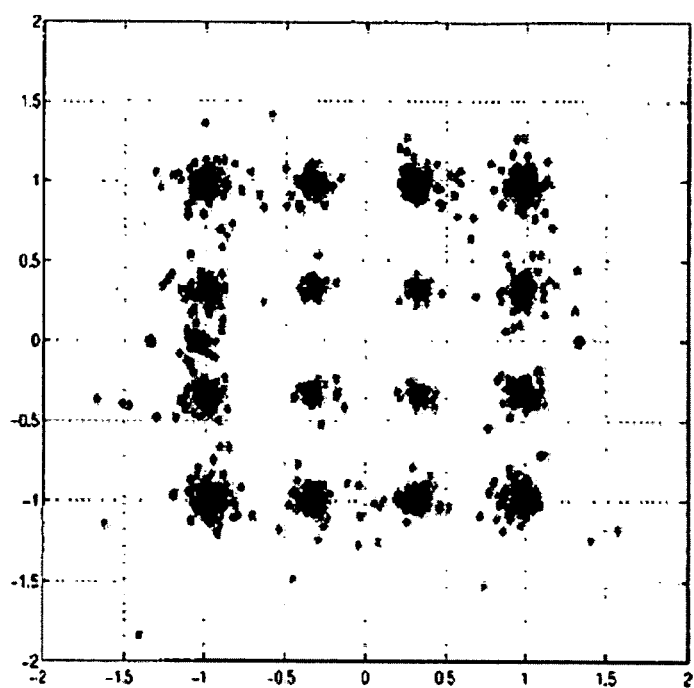
FIG. 10 is an IQ-diagram for the case in which the sampling point is ideal (i.e., $\epsilon=0$), interpolation in frequency is based on linear interpolation, the channel is with a uniform delay profile and a maximum delay spread of $T_m=100$ μs, and ideal pre-rotation was performed (i.e., pre-rotation based on the known correlation function of the channel).

Keeping the test conditions the same but increasing $T_m$ to 100 µs, the difference between the cases without and with pre-rotation can also clearly be seen in FIGS. 9 and 10, respectively. In the above-referenced U.S. patent application Ser. No. 10/920,928, entitled "Channel Estimation by Adaptive Interpolation" by Leif Wilhelmsson et. al., it was seen that by using an interpolation filter operating on complex-valued signals instead of a filter operating only on real-valued signals, the maximum delay spread that could be handled was increased by a factor of two. Comparing the IQ diagrams of FIGS. 7 and 10, it can be seen that by using pre-rotation, a similar result is seen in that when pre-rotation in accordance with the invention is used, twice the delay spread can be handled with similar performance in terms of demodulation errors. The reason for this similarity is that pre-rotation essentially has the effect of mixing down the signal to base-band, where the optimum interpolation filter is real.

Again referring to FIGS. 7 and 10, it is therefore concluded that the invention allows the designer to trade off delay spread handling capability with filter complexity. One could, for example, choose to handle a larger delay spread with a given interpolation filter. Alternatively, the pre-rotation described herein could be used as a means to reduce the required complexity of the interpolation filter for a given delay spread handling capability.

Figure 11:
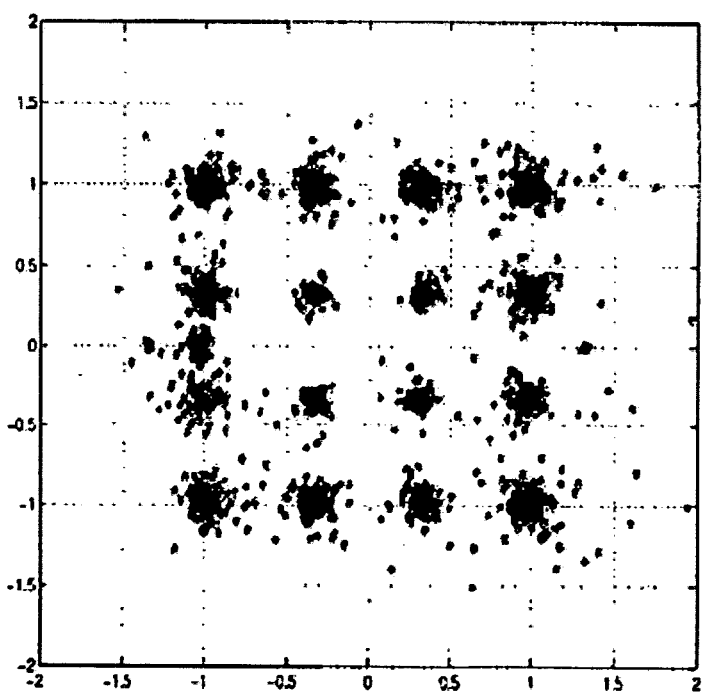
FIG. 11 is an IQ-diagram generated when interpolation in the frequency domain is based on linear interpolation, $T_m=100$ μs, an ideal sampling point is assumed, and pre-rotation in accordance with the invention is based on estimation of the correlation function (more on this below).
Figure 12:
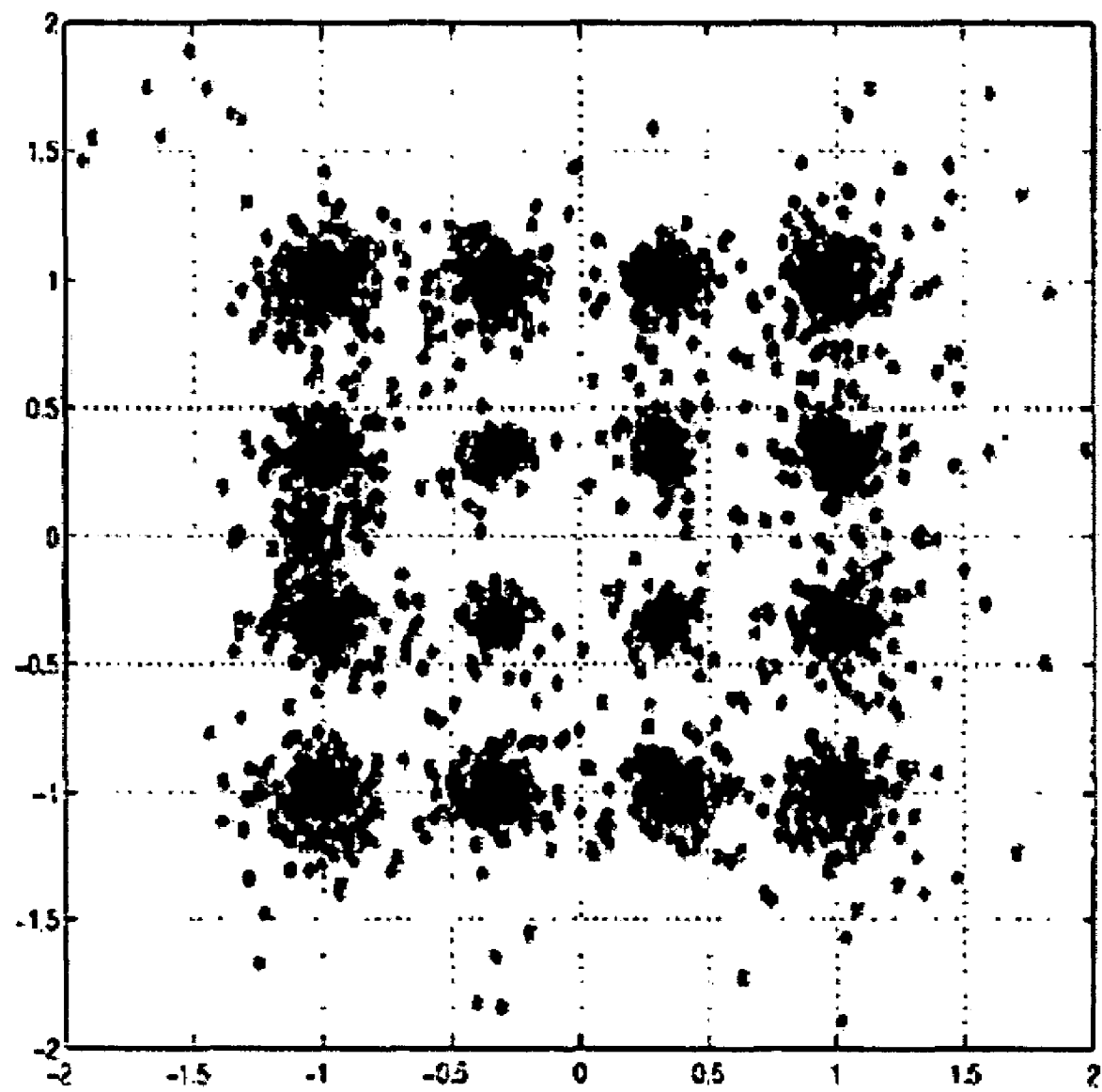
FIG. 12 is an IQ-diagram generated when interpolation in the frequency domain is based on cubic interpolation, $T_m=100$ μs, an ideal sampling point is assumed, and no pre-rotation is performed.

For example, consider the IQ diagrams depicted in FIGS. 11 and 12. FIG. 11 is an IQ-diagram generated when interpolation in the frequency domain is based on linear interpolation, $T_m$=100 µs, an ideal sampling point is assumed, and pre-rotation in accordance with the invention is based on estimation of the correlation function (more on this below). For comparison, FIG. 12 is an IQ-diagram generated when interpolation in the frequency domain is based on cubic interpolation, $T_m$=100 µs, an ideal sampling point is assumed, and no pre-rotation is performed. It can be seen from a comparison of these two figures that a filter with low complexity (such as a linear interpolation filter) together with pre-rotation might perform as well as or even better than a more complex filter (such as a cubic interpolation filter) without pre-rotation. Since the computational complexity of performing the rotation is much less than the additional complexity caused by having to use a more computationally intensive filter, pre-rotation is an effective means for reducing the overall complexity of channel estimation.

Until now it has been assumed that the correlation function of the channel was perfectly known, which of course is not the case in practical embodiments. One way to estimate the correlation function is to use an inverse FFT (IFFT), as described in M. Speth, S. Fechtel, G. Flock, and H. Meyr, "Optimum receiver design for OFDM-based broadband transmission—Part II: A case study," IEEE Trans. Commun., vol 49, pp. 571-578, April 2001. Using this idea to estimate the length of the impulse response of the channel, assuming the delay profile to be uniform, and then calculating a suitable pre-rotation based on this, the results depicted in FIG. 11 were obtained. As can be seen by comparing FIG. 11 with FIG. 10, there is virtually no difference between the IQ-diagram obtained with optimum pre-rotation (FIG. 10) and that based on the estimated pre-rotation (FIG. 11).

Figure 13:
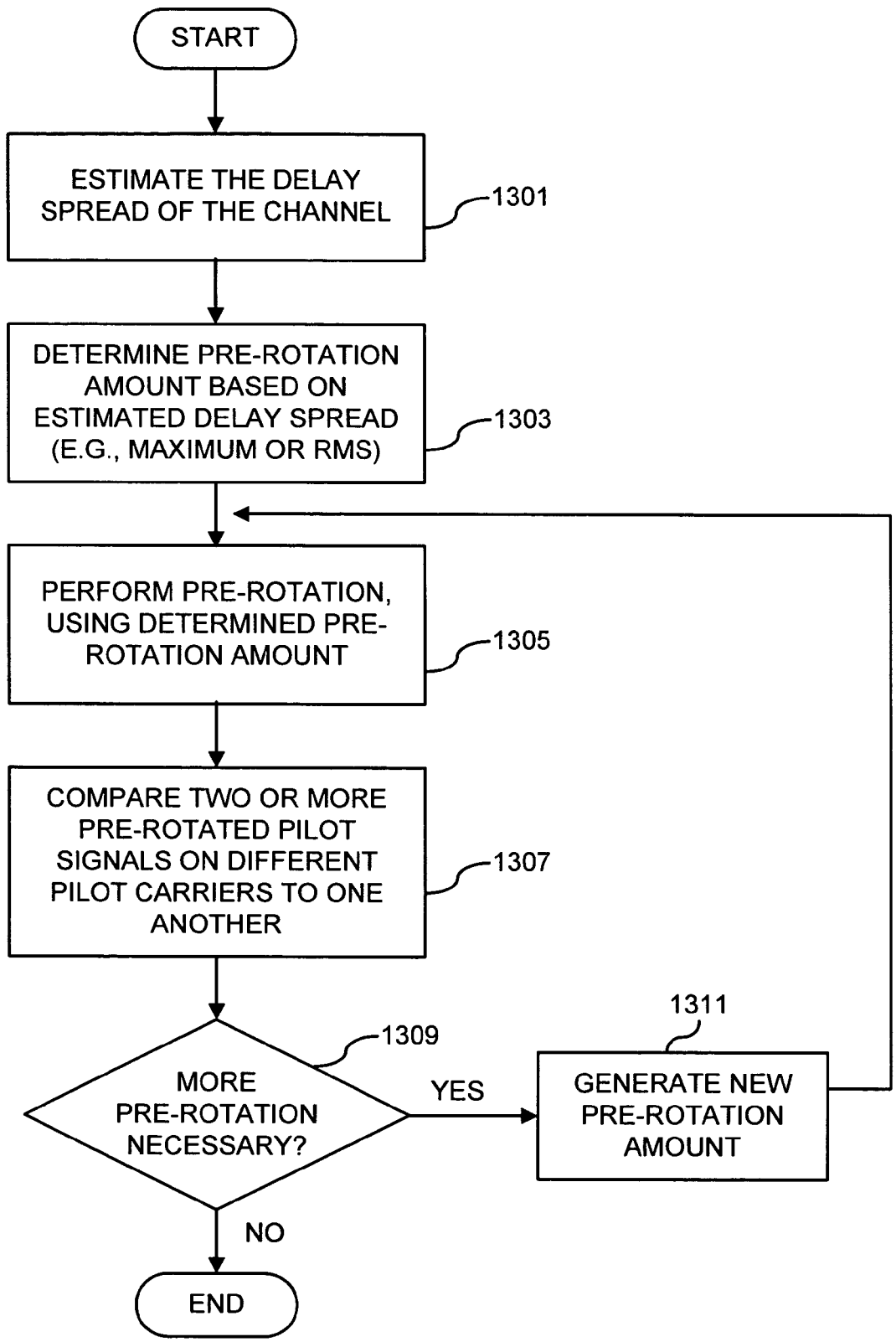
FIG. 13 is a flow chart of an exemplary embodiment in which iteration is performed to determine a suitable pre-rotation amount in accordance with an aspect of the invention.

In another aspect, since the length of the delay spread typically is easier to estimate than the actual correlation function (which also depends on shape of the delay profile), a way to determine a suitable pre-rotation amount will now be described with reference to the flow chart of an exemplary embodiment depicted in FIG. 13. First, the delay spread of the channel is estimated (block 1301). This may be, for example, the maximum delay spread. Alternatively, it may be the root-mean-square (rms) delay spread of the channel.

There are a number of known ways of determining delay spread of the channel. One way of estimating the maximum delay spread of the channel is to use an IFFT as described above with reference to the Speth et al. article. Alternatively, the maximum delay spread may be estimated prior to the FFT in a manner described in U.S. patent application Ser. No. 11/110,840, filed on even date herewith and entitled "Initial Parameter Estimation in OFDM Systems", by Leif Wilhelmsson et. al.

Using the estimated delay spread, the pre-rotation amount is then determined in a manner described earlier (block 1303). The signal (comprising a plurality of carriers) is then pre-rotated based on the determined pre-rotation amount (block 1305).

An iterative approach is then adopted, based on the fact that if the pre-rotation were ideal, then the expected rotation between two carriers would be zero. In the exemplary embodiment, this is achieved by using the pilots. Two or more pre-rotated pilot signals are compared with one another (block 1307). Based on how close they are to one another (e.g., by comparing how close to zero the rotation between the compared carriers is), it is then determined whether more pre-rotation is necessary (decision block 1309). If more pre-rotation is needed ("YES" path out of decision block 1309), then a new pre-rotation amount is calculated (block 1311) based on the rotation between carriers, and processing returns back to block 1305, where the loop including pre-rotation will be performed again. Blocks 1307 and 1309 may be performed based on the average rotation of the known pilots after the last pre-rotation was performed.

If the comparison of the two or more pre-rotated pilot signals shows that no further pre-rotation is necessary ("NO" path out of decision block 1309), then the process terminates.

Figure 14:
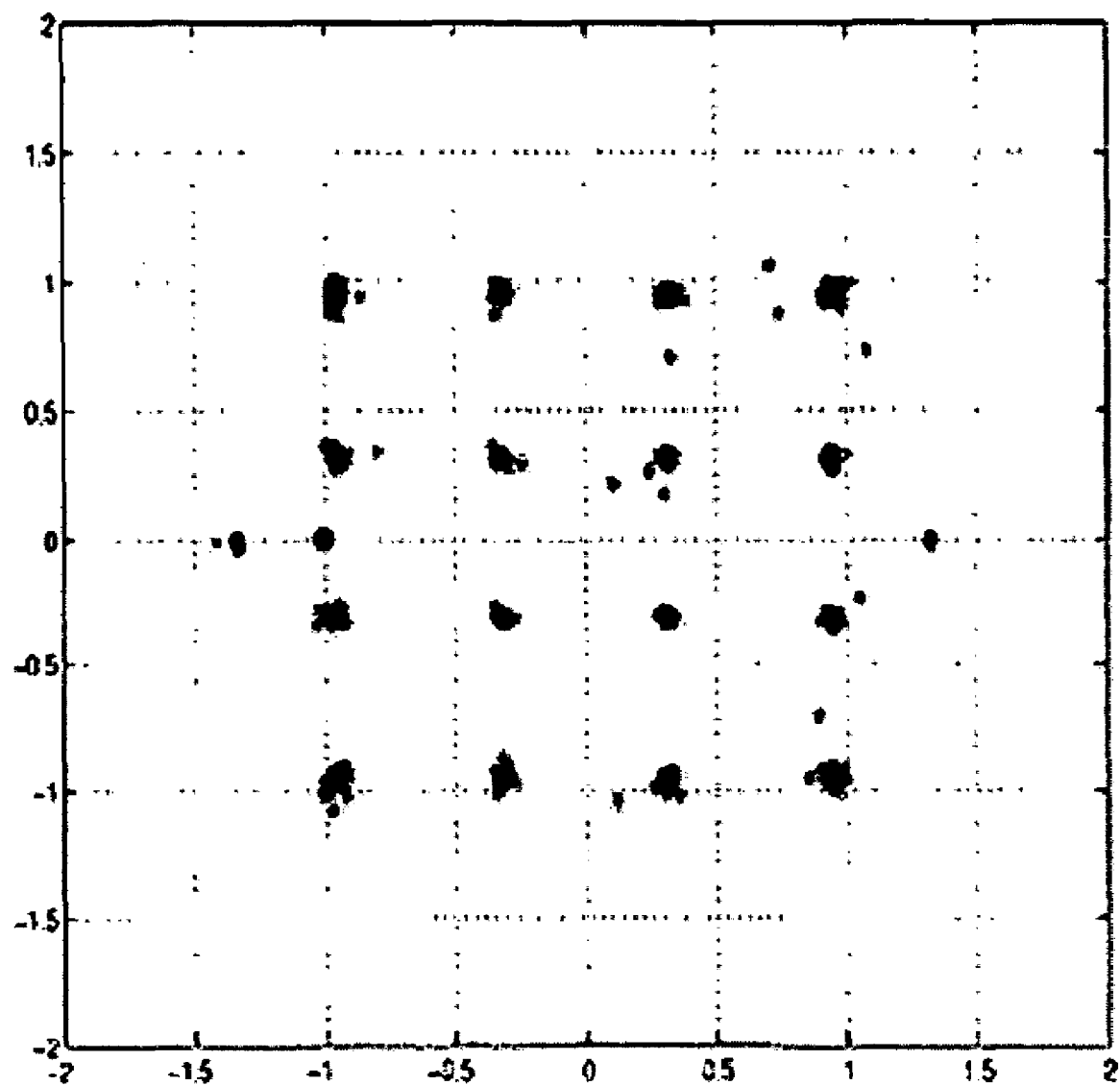
FIG. 14 is an IQ-diagram depicting exemplary signals generated when interpolation in the frequency domain is based on cubic interpolation, the maximum delay spread $T_m=100$ μs, an ideal sampling point is assumed and optimal pre-rotation is performed.
Figure 15:
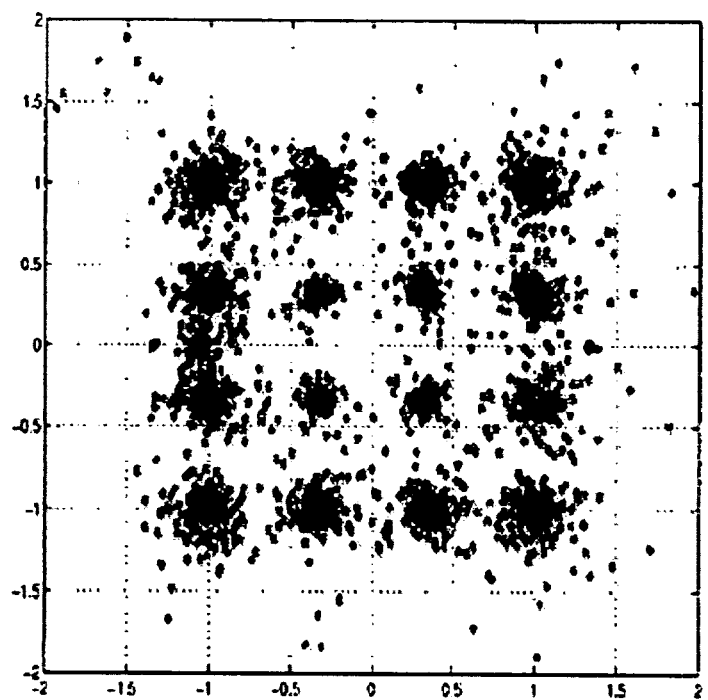
FIG. 15 is an IQ-diagram depicting exemplary signals generated when interpolation in the frequency domain is based on cubic interpolation, the maximum delay spread $T_m=100$ μs, an ideal sampling point is assumed and erroneously estimated pre-rotation is performed.
Figure 16:
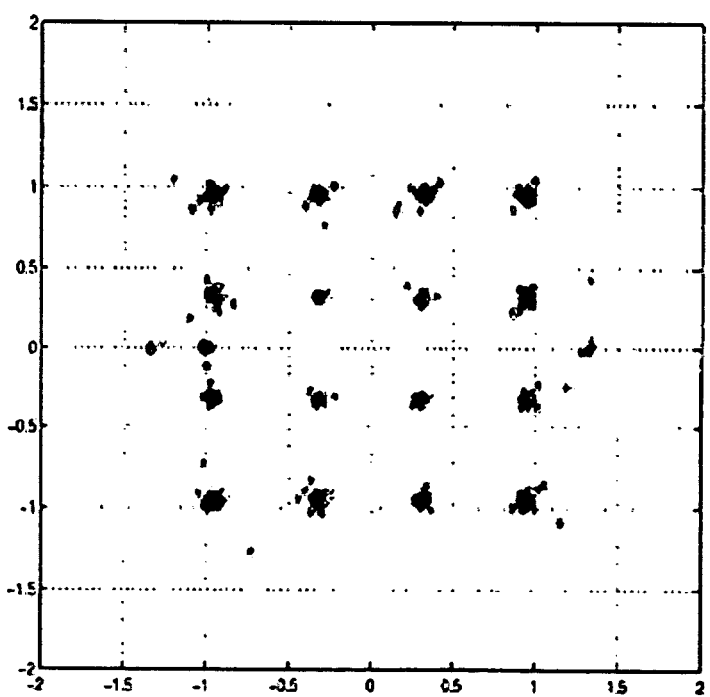
FIG. 16 is an IQ-diagram depicting exemplary signals generated when interpolation in the frequency domain is based on cubic interpolation, the maximum delay spread $T_m=100$ μs, an ideal sampling point is assumed and previously-generated pre-rotation results are iteratively updated, using the pilot signals to estimate how the pre-rotation should be updated in order to minimize the rotation between different carriers.

This iterative approach will also work in case one has done a poor estimation of the sampling time, in that it will ensure that this is compensated by proper pre-rotation. Insight into the quality of performance of this iterative approach can be gained by comparing the exemplary IQ-diagrams of FIGS. 14, 15, and 16. FIG. 14 is an IQ-diagram depicting exemplary signals generated when interpolation in the frequency domain is based on cubic interpolation, the maximum delay spread $T_m=100$ μs, an ideal sampling point is assumed and optimal pre-rotation is performed. FIG. 15 is an IQ-diagram depicting exemplary signals generated when interpolation in the frequency domain is based on cubic interpolation, the maximum delay spread $T_m=100$ μs, an ideal sampling point is assumed and erroneously estimated pre-rotation is performed. The IQ-diagram of FIG. 15 was generated by deliberately not pre-rotating using the actually estimated value of $T_m$. FIG. 16 is an IQ-diagram depicting exemplary signals generated when interpolation in the frequency domain is based on cubic interpolation, the maximum delay spread $T_m=100$ μs, an ideal sampling point is assumed and the pre-rotation results of FIG. 15 are iteratively updated, using the pilot signals to estimate how the pre-rotation should be updated in order to minimize the rotation between different carriers.

In the example depicted in FIG. 16, the process of using the pilot signals to determine whether the original pre-rotation needed to be adjusted was based on the average rotation of the known pilots after the first pre-rotation had been performed (results of which are shown in FIG. 15). Suppose that the pilots are placed at carrier k, where k=0, 3, 6, . . . , 6816. Then the average rotation between carriers can in principle be obtained by considering the rotation between carrier 0 and carrier 6816. However, since the phase value is between $-\pi$ an $\pi$ and the above rotation can be significantly larger, this additional pre-rotation amount was estimated by considering all phase differences between any two adjacent pilots (after the initial pre-rotation) and then summing these differences.

In alternative embodiments involving pre-rotation, the pre-rotation may be done prior to the FFT by properly shifting the input samples, in a similar way as a sampling error prior to the FFT can be compensated by proper rotation after the FFT.

In still other alternative embodiments, it is possible to make use of pre-rotation without actually estimating what the impulse response of the channel looks like. One might, for example, initially assume that the length of the impulse response of the channel equals the length of the GI, and use the corresponding pre-rotation amount. Although this will have a negative effect in case $T_m$ is small, it will increase the maximum value of $T_m$ that can be handled by a given filter. One might then, in an iterative fashion, update the applied pre-rotation.

In still other alternative embodiments, pre-rotation can be selectively applied based on whether the delay spread of the channel exceeds a pre-determined value.

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of estimating a channel response from a received signal that comprises two or more different carriers in an Orthogonal Frequency Division Multiplexing (OFDM) communications system, the method comprising:

for each of the carriers, determining a rotation amount that is at least in part a function of a frequency separation between two adjacent carriers, a delay spread of the channel, and a position of the carrier relative to other carriers within the received signal;

processing the received signal and thereby generating a processed signal, whereby the processing includes processing with a Fast Fourier Transform;

prior to performing frequency interpolation as part of a channel estimation process, rotating the carrier components of the processed signal by corresponding ones of the rotation amounts; and estimating the channel response by performing the channel estimation process at least in part on the rotated processed signal, wherein determining the rotation amounts and rotating the carrier components of the processed signal by corresponding ones of the rotation amounts comprise:

for each of the carriers, generating an initial rotation amount that is at least in part a function of the frequency separation between two adjacent carriers, a delay spread of the channel, and a position of the carrier relative to other carriers within the received signal;

rotating the carrier components of the processed signal by corresponding ones of the rotation amounts; and iteratively adjusting the initial rotation amounts based on a comparison of rotated signals on different pilot frequencies with one another and then again rotating the previously rotated processed signal by the adjusted rotation amount until an iteration termination condition is satisfied.

2. The method of claim 1, wherein the rotation amount is determined in accordance with:

$$e^{i2\pi k(\Delta f T_{ds} c_{ds})},$$

where k is an index that identifies the position of a carrier included within the received signal, $\Delta f$ is the frequency separation between two adjacent carriers, $T_{ds}$ represents the delay spread of the channel, and $c_{ds}$ is a constant.

3. The method of claim 2, wherein $T_{ds}$ represents a maximum delay spread, $T_m$, of the channel and $c_{ds}$ equals ½.

4. The method of claim 2, wherein $T_{ds}$ represents a root-mean-square delay spread, $T_{rms}$, of the channel, and $c_{ds}$ equals 1.

5. The method of claim 1, wherein the rotation amount is determined in accordance with:

$$e^{i2\pi k(\epsilon/N+\Delta fT_{ds}c_{ds})},$$

where $\epsilon$ represents an amount by which an FFT window is placed too early, N is a number of samples corresponding to a duration of an information carrying part of one symbol modulated onto the received signal, k is an index that identifies a position of a carrier included within the received signal, $\Delta f$ is the frequency separation between two adjacent carriers, $T_{ds}$ represents the delay spread of the channel, and $c_{ds}$ is a constant.

6. The method of claim 5, wherein $T_{ds}$ represents a maximum delay spread, $T_m$, of the channel and $c_{ds}$ equals ½.

7. The method of claim 5, wherein $T_{ds}$ represents a root-mean-square delay spread $T_{rms}$ of the channel and $c_{ds}$ equals 1.

8. The method of claim 1, wherein the rotation amount is determined based on a correlation function of the channel.

9. The method of claim 1, wherein the delay spread of the channel is a maximum delay spread of the channel.

10. The method of claim 1, wherein the delay spread of the channel is a root-mean-square delay spread of the channel.

11. The method of claim 1, wherein:
the received signal comprises a guard interval followed by a symbol; and
the method comprises using a duration of the guard interval as an initial estimate of the delay spread of the channel.

12. The method of claim 1, wherein rotating the carrier components of the processed signal is performed only if a comparison between the delay spread of the channel and a predefined value satisfies a predefined relationship.

13. A method of estimating a channel response from a received signal that comprises two or more different carriers in an Orthogonal Frequency Division Multiplexing (OFDM) communications system, the method comprising:
for each of the carriers, determining a rotation amount that is at least in part a function of a frequency separation between two adjacent carriers, a delay spread of the channel, and a position of the carrier relative to other carriers within the received signal;
prior to processing the received signal with a Fast Fourier Transform, shifting samples of the received signal by an amount based on the rotation amount;
processing the shifted signal with a Fast Fourier Transform, thereby generating a rotated processed signal that is rotated based on the rotation amount; and
estimating the channel response based on the rotated processed signal;
wherein determining the rotation amount, shifting samples of the received signal by an amount based on the rotation amount, and processing the shifted signal with a Fast Fourier Transform comprise:
for each of the carriers, generating an initial rotation amount that is at least in part a function of the frequency separation between two adjacent carriers, a delay spread of the channel, and a position of the carrier relative to other carriers within the received signal;
shifting samples of the received signal by an initial amount based on the rotation amounts;
processing the shifted signal with the Fast Fourier Transform, thereby generating an initial rotated processed signal that is rotated by the initial rotation amounts; and
iteratively adjusting the initial rotation amounts based on a comparison of rotated signals on different pilot frequencies with one another and then again shifting samples of the received signal by an amount based on the adjusted rotation amounts and processing the shifted signal with the Fast Fourier Transform until an iteration termination condition is satisfied.

14. The method of claim 13, wherein the rotation amount is determined in accordance with:

$$e^{i2\pi k(\Delta fT_{ds}c_{ds})},$$

where k is an index that identifies the position of a carrier included within the received signal, $\Delta f$ is the frequency separation between two adjacent carriers, $T_{ds}$ represents the delay spread of the channel, and $c_{ds}$ is a constant.

15. The method of claim 14, wherein $T_{ds}$ represents a maximum delay spread, $T_m$, of the channel and $c_{ds}$ equals ½.

16. The method of claim 14, wherein $T_{ds}$ represents a root-mean-square delay spread, $T_{rms}$, of the channel, and $c_{ds}$ equals 1.

17. The method of claim 13, wherein the rotation amount is determined in accordance with:

$$e^{i2\pi k(\epsilon/N+\Delta fT_{ds}c_{ds})},$$

where $\epsilon$ represents an amount by which an FFT window is placed too early, N is a number of samples corresponding to a duration of an information carrying part of one symbol modulated onto the received signal, k is an index that identifies a position of a carrier included within the received signal, $\Delta f$ is the frequency separation between two adjacent carriers, $T_{ds}$ represents the delay spread of the channel, and $c_{ds}$ is a constant.

18. The method of claim 17, wherein $T_{ds}$ represents a maximum delay spread, $T_m$, of the channel and $c_{ds}$ equals ½.

19. The method of claim 17, wherein $T_{ds}$ represents a root-mean-square delay spread $T_{rms}$ of the channel and $c_{ds}$ equals 1.

20. The method of claim 13, wherein the rotation amount is determined based on a conelation function of the channel.

21. The method of claim 13, wherein the delay spread of the channel is a maximum delay spread of the channel.

22. The method of claim 13, wherein the delay spread of the channel is a root-mean-square delay spread of the channel.

23. The method of claim 13, wherein:
the received signal comprises a guard interval followed by a symbol; and
the method comprises using a duration of the guard interval as an initial estimate of the maximum delay spread of the channel.

24. The method of claim 13, wherein shifting samples of the received signal by an amount based on the rotation amount is performed only if a comparison between the delay spread of the channel and a predefined value satisfies a predefined relationship.

25. The method of claim 13, wherein determining the rotation amount, shifting samples of the received signal by an amount based on the rotation amount, and processing the shifted signal with a Fast Fourier Transform comprise:
for each of the carriers, generating an initial rotation amount that is at least in part a function of the frequency separation between two adjacent carriers, a delay spread of the channel, and a position of the carrier relative to other carriers within the received signal;
shifting samples of the received signal by an initial amount based on the rotation amounts;
processing the shifted signal with the Fast Fourier Transform, thereby generating an initial rotated processed signal that is rotated by the initial rotation amounts; and
iteratively adjusting the initial rotation amounts based on a comparison of rotated signals on different carriers with one another and then again shifting samples of the received signal by an amount based on the adjusted rotation amounts and processing the shifted signal with the Fast Fourier Transform until an iteration termination condition is satisfied.

26. An apparatus for estimating a channel response from a received signal that comprises two or more different carriers in an Orthogonal Frequency Division Multiplexing (OFDM) communications system, the apparatus comprising:
   logic that, for each of the carriers, determines a rotation amount that is at least in part a function of a frequency separation between two adjacent carriers, a delay spread of the channel, and a position of the carrier relative to other carriers within the received signal;
   logic that processes the received signal and thereby generating a processed signal, whereby the processing includes processing with a Fast Fourier Transform;
   logic that, prior to performing frequency interpolation as part of a channel estimation process, rotates the carrier components of the processed signal by corresponding ones of the rotation amounts; and
   logic that estimates the channel response by performing the channel estimation process at least in part on the rotated processed signal,
   wherein the logic that determines the rotation amounts and the logic that rotates the carrier components of the processed signal by corresponding ones of the rotation amounts comprise:
   logic that, for each of the carriers, generates an initial rotation amount that is at least in part a function of the frequency separation between two adjacent carriers, a delay spread of the channel, and a position of the carrier relative to other carriers within the received signal;
   logic that rotates the carrier components of the processed signal by corresponding ones of the rotation amounts; and
   logic that iteratively adjusts the initial rotation amounts based on a comparison of rotated signals on different pilot frequencies with one another and then again rotates the previously rotated processed signal by the adjusted rotation amount until an iteration termination condition is satisfied.

27. The apparatus of claim 26, wherein the rotation amount is determined in accordance with:

$$e^{i2\pi k(\Delta f T_{ds} c_{ds})},$$

where k is an index that identifies the position of a carrier included within the received signal, $\Delta f$ is the frequency separation between two adjacent carriers, $T_{ds}$ represents the delay spread of the channel, and $c_{ds}$ is a constant.

28. The apparatus of claim 27, wherein $T_{ds}$ represents a maximum delay spread, $T_m$, of the channel and $c_{ds}$ equals ½.

29. The apparatus of claim 27, wherein $T_{ds}$ represents a root-mean-square delay spread, $T_{rms}$, of the channel, and $c_{ds}$ equals 1.

30. The apparatus of claim 26, wherein the rotation amount is determined in accordance with:

$$e^{i2\pi k(\epsilon/N + \Delta f T_{ds} c_{ds})},$$

where $\epsilon$ represents an amount by which an FFT window is placed too early, N is a number of samples corresponding to a duration of an information carrying part of one symbol modulated onto the received signal, k is an index that identifies a position of a carrier included within the received signal, $\Delta f$ is the frequency separation between two adjacent carriers, $T_{ds}$ represents the delay spread of the channel, and $c_{ds}$ is a constant.

31. The apparatus of claim 30, wherein $T_{ds}$ represents a maximum delay spread, $T_m$, of the channel and $c_{ds}$ equals ½.

32. The apparatus of claim 30, wherein $T_{ds}$ represents a root-mean-square delay spread $T_{rms}$ of the channel and $c_{ds}$ equals 1.

33. The apparatus of claim 26, wherein the rotation amount is determined based on a correlation function of the channel.

34. The apparatus of claim 26, wherein the delay spread of the channel is a maximum delay spread of the channel.

35. The apparatus of claim 26, wherein the delay spread of the channel is a root-mean-square delay spread of the channel.

36. The apparatus of claim 26, wherein:
   the received signal comprises a guard interval followed by a symbol; and
   the apparatus comprises logic that uses a duration of the guard interval as an initial estimate of the delay spread of the channel.

37. The apparatus of claim 26, wherein the logic that rotates the carrier components of the processed signal operates only if a comparison between the delay spread of the channel and a predefined value satisfies a predefined relationship.

38. An apparatus for estimating a channel response from a received signal that comprises two or more different carriers in an Orthogonal Frequency Division Multiplexing (OFDM) communications system, the apparatus comprising:
   logic that, for each of the carriers, determines a rotation amount that is at least in part a function of a frequency separation between two adjacent carriers, a delay spread of the channel, and a position of the carrier relative to other carriers within the received signal;
   logic that, prior to processing the received signal with a Fast Fourier Transform, shifts samples of the received signal by an amount based on the rotation amount;
   logic that processes the shifted signal with a Fast Fourier Transform, thereby generating a rotated processed signal that is rotated based on the rotation amount; and
   logic that estimates the channel response based on the rotated processed signal,
   wherein the logic that determines the rotation amount, the logic that shifts samples of the received signal by an amount based on the rotation amount, and the logic that processes the shifted signal with a Fast Fourier Transform comprise:
   logic that, for each of the carriers, generates an initial rotation amount that is at least in part a function of the frequency separation between two adjacent carriers, a delay spread of the channel, and a position of the carrier relative to other carriers within the received signal;
   logic that shifts samples of the received signal by an initial amount based on the rotation amounts;
   logic that processes the shifted signal with the Fast Fourier Transform, thereby generating an initial rotated processed signal that is rotated by the initial rotation amounts; and
   logic that iteratively adjusts the initial rotation amount based on a comparison of rotated signals on different pilot frequencies with one another and then again shifts samples of the received signal and processing the shifted signal with the Fast Fourier Transform until an iteration termination condition is satisfied.

39. The apparatus of claim 38, wherein the rotation amount is determined in accordance with:

$$e^{i2\pi k(\Delta f T_{ds} c_{ds})},$$

where k is an index that identifies the position of a carrier included within the received signal, $\Delta f$ is the frequency separation between two adjacent carriers, $T_{ds}$ represents the delay spread of the channel, and $c_{ds}$ is a constant.

40. The apparatus of claim 39, wherein $T_{ds}$ represents a maximum delay spread, $T_m$, of the channel and $c_{ds}$ equals ½.

41. The apparatus of claim 39, wherein $T_{ds}$ represents a root-mean-square delay spread, $T_{rms}$, of the channel, and $c_{ds}$ equals 1.

42. The apparatus of claim 38, wherein the rotation amount is determined in accordance with:

$$e^{i2\pi k(\epsilon/N + \Delta f T_{ds} c_{ds})},$$

where $\epsilon$ represents an amount by which an FFT window is placed too early, N is a number of samples corresponding to a duration of an information carrying part of one symbol modulated onto the received signal, k is an index that identifies a position of a carrier included within the received signal, $\Delta f$ is the frequency separation between two adjacent carriers, $T_{ds}$ represents the delay spread of the channel, and $c_{ds}$ is a constant.

43. The apparatus of claim 42, wherein $T_{ds}$ represents a maximum delay spread, $T_m$, of the channel and $c_{ds}$ equals ½.

44. The apparatus of claim 42, wherein $T_{ds}$ represents a root-mean-square delay spread $T_{rms}$ of the channel and $c_{ds}$ equals 1.

45. The apparatus of claim 38, wherein the rotation amount is determined based on a correlation function of the channel.

46. The apparatus of claim 38, wherein the delay spread of the channel is a maximum delay spread of the channel.

47. The apparatus of claim 38, wherein the delay spread of the channel is a root-mean-square delay spread of the channel.

48. The apparatus of claim 38, wherein:
the received signal comprises a guard interval followed by a symbol; and
the apparatus comprises logic that uses a duration of the guard interval as an initial estimate of the maximum delay spread of the channel.

49. The apparatus of claim 38, wherein the logic that shifts samples of the received signal by an amount based on the rotation amount operates only if a comparison between the delay spread of the channel and a predefined value satisfies a predefined relationship.

50. A machine-readable storage medium having stored therein a set of program instructions for estimating a channel response from a received signal that comprises two or more different carriers in an Orthogonal Frequency Division Multiplexing (OFDM) communications system, the set of program instructions causing a processor and associated logic to perform:
for each of the carriers, determining a rotation amount that is at least in part a function of a frequency separation between two adjacent carriers, a delay spread of the channel, and a position of the carrier relative to other carriers within the received signal;
processing the received signal and thereby generating a processed signal, whereby the processing includes processing with a Fast Fourier Transform;
prior to performing frequency interpolation as part of a channel estimation process, rotating the carrier components of the processed signal by corresponding ones of the rotation amounts; and
estimating the channel response by performing the channel estimation process at least in part on the rotated processed signal,
wherein determining the rotation amounts and rotating the carrier components of the processed signal by corresponding ones of the rotation amounts comprise:
for each of the carriers, generating an initial rotation amount that is at least in part a function of the frequency separation between two adjacent carriers, a delay spread of the channel, and a position of the carrier relative to other carriers within the received signal;
rotating the carrier components of the processed signal by corresponding ones of the rotation amounts; and
iteratively adjusting the initial rotation amounts based on a comparison of rotated signals on different pilot frequencies with one another and then again rotating the previously rotated processed signal by the adjusted rotation amount until an iteration termination condition is satisfied.

51. A machine-readable storage medium having stored therein a set of program instructions for estimating a channel response from a received signal that comprises two or more different pilot carriers in an Orthogonal Frequency Division Multiplexing (OFDM) communications system, the set of program instructions causing a processor and associated logic to perform:
for each of the carriers, determining a rotation amount that is at least in part a function of a frequency separation between two adjacent carriers, a delay spread of the channel, and a position of the carrier relative to other carriers within the received signal;
prior to processing the received signal with a Fast Fourier Transform, shifting samples of the received signal by an amount based on the rotation amount;
processing the shifted signal with a Fast Fourier Transform, thereby generating a rotated processed signal that is rotated based on the rotation amount; and
estimating the channel response based on the rotated processed signal,
wherein determining the rotation amount, shifting samples of the received signal by an amount based on the rotation amount, and processing the shifted signal with a Fast Fourier Transform comprise:
for each of the carriers, generating an initial rotation amount that is at least in part a function of the frequency separation between two adjacent carriers, a delay spread of the channel, and a position of the carrier relative to other carriers within the received signal;
shifting samples of the received signal by an initial amount based on the rotation amounts;
processing the shifted signal with the Fast Fourier Transform, thereby generating an initial rotated processed signal that is rotated by the initial rotation amounts; and
iteratively adjusting the initial rotation amounts based on a comparison of rotated signals on different pilot frequencies with one another and then again shifting samples of the received signal by an amount based on the adjusted rotation amounts and processing the shifted signal with the Fast Fourier Transform until an iteration termination condition is satisfied.

* * * * *

UNITED STATES PATENT AND TRADEMARK OFFICE
CERTIFICATE OF CORRECTION

PATENT NO. : 7,474,611 B2 Page 1 of 1
APPLICATION NO. : 11/110838
DATED : January 6, 2009
INVENTOR(S) : Svensson et al.

It is certified that error appears in the above-identified patent and that said Letters Patent is hereby corrected as shown below:

In Column 4, Line 40, delete "(cd," and insert -- ($c_{ds}$ --, therefor.

In Column 15, Line 48, in Claim 13, delete "signal;" and insert -- signal, --, therefor.

In Column 16, Line 35, in Claim 20, delete "conelation" and insert -- correlation --, therefor.

Signed and Sealed this

Second Day of June, 2009

JOHN DOLL
*Acting Director of the United States Patent and Trademark Office*